US009458021B2

(12) United States Patent
Mitra

(10) Patent No.: US 9,458,021 B2
(45) Date of Patent: Oct. 4, 2016

(54) SOL-GEL METHOD FOR SYNTHESIS OF NANO-POROUS CARBON

(71) Applicant: Farad Power, Inc., Sunnyvale, CA (US)

(72) Inventor: Shantanu Mitra, Hillsborough, CA (US)

(73) Assignee: Farad Power, Inc., Hillsborough, CA (US)

( * ) Notice: Subject to any disclaimer, the term of this patent is extended or adjusted under 35 U.S.C. 154(b) by 0 days.

(21) Appl. No.: 14/341,725

(22) Filed: Jul. 25, 2014

(65) Prior Publication Data

US 2015/0030525 A1 Jan. 29, 2015

Related U.S. Application Data

(60) Provisional application No. 61/958,482, filed on Jul. 27, 2013.

(51) Int. Cl.

| C01B 31/08 | (2006.01) |
|---|---|
| H01M 4/587 | (2010.01) |
| B01J 20/30 | (2006.01) |
| B01J 20/20 | (2006.01) |
| H01G 11/36 | (2013.01) |
| H01G 11/86 | (2013.01) |
| C01B 31/02 | (2006.01) |
| C01B 31/10 | (2006.01) |

(52) U.S. Cl.

CPC .............. *C01B 31/08* (2013.01); *B01J 20/20* (2013.01); *B01J 20/3078* (2013.01); *C01B 31/02* (2013.01); *C01B 31/10* (2013.01); *H01G 11/36* (2013.01); *H01G 11/86* (2013.01); *H01M 4/587* (2013.01); *Y02E 60/13* (2013.01)

(58) Field of Classification Search

CPC ..................................................... C01B 31/08

See application file for complete search history.

(56) References Cited

U.S. PATENT DOCUMENTS

| 6,589,904 | B1 | 7/2003 | Iwasaki | |
|---|---|---|---|---|
| 7,718,155 | B2 | 5/2010 | Zhang | |
| 7,803,345 | B2 | 9/2010 | Leis | |
| 7,887,771 | B2 * | 2/2011 | Sun | B82Y 30/00 |
| | | | | 423/445 R |
| 8,057,774 | B2 * | 11/2011 | Kim | B01J 21/18 |
| | | | | 423/445 R |
| 8,404,384 | B2 | 3/2013 | Feaver | |
| 2006/0057355 | A1 | 3/2006 | Suzuki | |
| 2009/0170000 | A1 | 7/2009 | Coowar | |

FOREIGN PATENT DOCUMENTS

WO 2015017287 A1 2/2015

OTHER PUBLICATIONS

Liu, C. et al., "Graphene-Based Supercapacitor with an Ultrahigh Energy Density", Nano Letters, 2010, 10 (12):863-4868.
"Basic Research Needs for Electrical Energy Storage: Report of the Basic Energy Sciences Workshop on Electrical Energy Storage", Apr. 2-4, 2007, Office of Basic Energy Sciences, DOE Jul. 2007.
Pandolfo, A. G. and Hollenkamp A. F., "Carbon Properties and Their Role in Supercapacitors", J. Power Sources, 2006, 157:11-27.
Kang, Y. J., et al., All-Solid-State Flexible Supercapacitors Fabricated with Bacterial Nanocellulose Papers, Carbon Nanotubes, and Triblock-Copolymer Ion Gels, Nanotechnology, 2012, 23(6):065401.
Burke, A. J., "Ultracapacitors: Why, How, and Where is the Technology", Power Sources, 2000, 91:37-50.
Barbieri, O., et al., "Capacitance Limits of High Surface Area Activated Carbons for Double Layer Capacitors", Carbon, 2005, 43:1303-1310.
Endo, M., et al., "Morphology and Organic EDLC Applications of Chemically Activated AR-resin-based Carbons", Carbon, 2002, 40:2613-2626.
Vinod, M.P. et al., "A Novel Luminescent Functionalized Siloxane Polymer", J. Phys. Chem. B, 2003, 107:1583-1588.
Vinod, M.P. et al., "Silicon Based Light Emitting Gels", Appl. Phys. Let., 1996, 68:81-83.
Suresh, S., et al., "Formation of Silicon Nanoclusters during the Reaction of Beta-Ionone with Tetrachlorosilane", Chem. Mater., 1997, 9:1186-1190.
Burket, C.L., et al., "Genesis of porosity in polyfurfuryl alcohol derived nanoporous carbon", Carbon, 2006, 44 (14):2957-2963.
Gonzalez, R., et al., "Polymerization of furfuryl alcohol with trifluoroacetic acid: the influence of experimental conditions", Makromol. Chem., 1992, 193:1-9.
Titirici, M-M. et al., "Replication and Coating of Silica Templates by Hydrothermal Carbonization", Adv. Funct. Mater., 2007, 17:1010-1018.
Ragan, S. and Megonnell, N., "Activated Carbon from Renewable Resources—Ligin, Cellulose Chem. Tech.", 2011, 45(7):527.
Lufrano, F. et al., "Mesoporous Carbon Materials as Electrodes for Electrochemical Supercapacitors," Int. J. Electrochem. Sci., 2010, 5:903-916.
Wei, D., et al., "Transparent, flexible, and solid-state supercapacitors based on room temperature ionic liquid gel", Electrochemistry Communications, 2009, 11(10):1996-1999; doi: 10.1016/j.elecom. 2009.10.011.
Portet, C., et al., "High Power Density Electrodes for Carbon Supercapacitor Applications", Electrochimica Acta, 2005, 50(20):4174-4181.
Isikli, S., et al., "Substrate-Dependent Performance of Supercapacitors Based on Organic Redox Couple Impregnated on Carbon," J. Power Sources, 2012, 206:53-58.
Falconer, I. R., et al.; "Using Activated Carbon to Remove Toxicity from Drinking Water Containing Cyanobacterial Bloom.", J. Am. Water Works Assn., 1989, pp. 102-105.

(Continued)

*Primary Examiner* — Stuart Hendrickson

(74) *Attorney, Agent, or Firm* — Geeta Kadambi Riddhi IP LLC

(57) ABSTRACT

The present patent application discloses a novel sol-gel process to synthesize a nano-porous solid carbon material—suitable for use in electrodes in energy storage applications—from a combination of liquid reagents that undergo a polymerization reaction to form a matrix.

18 Claims, 9 Drawing Sheets

(56) References Cited

OTHER PUBLICATIONS

Schmillel, H.G. et al., "Hydrogen Absorption in Carbon Nanostructures: Comparison of Nanotubes, Fibers, and Coals", Chemistry—A European Journal, 2003, 19:4764-4770.

Tylianakis, E. et al., "Designing Novel Nanoporous Architectures of Carbon Nanotubes for Hydrogen Storage", Int. J. Hydrogen Energy, 2014, 39(18):9825-9829.

He, Y. et al., "Microporous Metal-Organic Frameworks for Storage and Separation of Small Hydrocarbons", Chem. Commun., 2012, 48(97):11813-11831.

Lee, J. Y., "Gas sorption of Microporous Metal Organic Frameworks", J. Solid State Chem., 2005, 178:2527-2532.

Masaki, Y. et al., eds., Brood, R. J., Chapter I: "Synopsis of the Lithium-Ion Battery Markets", in Lithium Ion Batteries, 2009, Springer, New York, NY.

Park, M-H. et al., "Flexible High Energy Li-Ion Batteries with Fast-Charging Capability", Nano Ltrs., 2014, 14:4083-4089.

Jacques, E. et al., "The Effect of Lithium-Intercalation on the Mechanical Properties of Carbon Fibres", Carbon, 2014, 68:725-733.

International Search Report, PCT/US2014/048303, dated Nov. 14, 2014.

Written Opinion, PCT/US2014048303, dated Nov. 14, 2014.

Search History, PCT/US2014048303, dated Nov. 14, 2014.

\* cited by examiner

A  B

A

B

A

B

SOL-GEL METHOD FOR SYNTHESIS OF NANO-POROUS CARBON

CROSS-REFERENCE TO RELATED APPLICATIONS

This application claims the benefit of U.S. Provisional Application Ser. No. 61/958,482, filed Jul. 27, 2013, the contents of which are incorporated in their entirety.

BACKGROUND OF THE INVENTION

Interest in high-efficiency energy storage devices has been growing steadily over the past several years and innovations in Li-ion battery technology have delivered improvements, in both power-density and energy-density, over Ni—Cd devices and the original industry workhorse-lead-acid batteries. Concurrently, interest in Electrical Double Layer Capacitors (EDLC)—also known as supercapacitors or ultracapacitors—has also spiked due to their potentially excellent power-density capabilities, and endurance for millions of cycles in conjunction with energy densities much higher than the traditional electrolytic capacitors. This has opened up EDLCs to new energy-storage applications in commercial environments for "energy-smoothing" and "transient high-load applications" (while traditional capacitors are mostly used as circuit components) and for short-term UPS (uninterrupted power supply) applications in which conventional batteries (low power) or conventional capacitors (low energy) are of little practical use.

Unlike batteries, supercapacitors do not undergo any Faradic electrochemical reactions and rely only on the rearrangement of ions in the electrolyte—near the electrode surface next to the electrodes—to form the electric double layer that stores the energy. Because this rearrangement process does not involve any charge transfer, it is much faster than the conventional Faradic reactions and the extent of the double layer formation (and hence the energy density) is theoretically proportional to the surface area of the electrodes. Thus, porous electrode materials with high surface areas are used in supercapacitor electrodes and carbon made from coconut shell charcoal (U.S. Pat. No. 6,589,904; Iwasaki et al.) has evolved as the material of choice due to its high surface area, wide availability and established manufacturing process. There are, however, some limitations faced by these electrodes that have limited the application of supercapacitors.

Energy density remains the key limiting factor in a wider acceptance of EDLCs in conventional energy storage applications; although other factors like the self-discharge rate and resistance also play important roles. While lab-scale devices with energy densities of 30 to 85 Wh/Kg have been announced (Liu, C., et al.; $Nano\ Letters$, 2010, 10(12):863-4868; Kang, Y. J., et al., $Nanotechnology$, 2012, 23(6):065401), commercially available devices today are typically rated at 5 Wh/Kg, much lower than Lithium ion batteries (100-150 Wh/kg) and even the conventional lead-acid batteries (40 Wh/Kg) ("Basic Research Needs for Electrical Energy Storage: Report of the Basic Energy Sciences Workshop on Electrical Energy Storage"; Apr. 2-4, 2007, Office of Basic Energy Sciences, DOE, July 2007).

All the commercially available supercapacitors today use activated carbon electrodes with surface areas of 1000 $m^2/g$ and above (Pandolfo, A. G. and A. F. Hollenkamp, A. F., $J.\ Power\ Sources$, 2006, 157:11-27; Burke, A. J., $Power\ Sources$, 2000, 91:37-50), and are made predominantly from coconut-shell charcoal, using powder-processing techniques to make electrodes from the activated carbon powder. Specific capacitance of these coconut-shell-charcoal-based devices is limited to ~100 F/g in non-aqueous electrolytes—even with porous carbon electrode surface areas of 2000 $m^2/g$ and beyond. (See Barbieri, O. et al., $Carbon$, 2005, 43:1303-1310.) Several factors are believed to contribute to this behavior, including: 1) lack of control over porosity of the carbon electrodes; 2) impurities in the carbon; and 3) concentration of surface functional groups in the carbon material.

Coconut shell carbon (and by extension carbon from other natural sources) makes it difficult to control the inherent pore structure or to add other functional groups into the carbon to enhance performance by changing the surface chemistry. Also, concerns over removing impurities are high, since the starting materials already contain impurities from their natural sources.

Methods for producing nano-porous carbon for EDLC electrodes similar energy storage devices and are known. For example, Kuraray Chemical Corporation, Japan, which supplies most of the commercially available porous carbon for EDLC electrodes today, discloses a technique for making porous carbon from natural sources like coconut shell by acid activation at elevated temperature (U.S. Pat. No. 6,589,904; Iwasaki et al.). Downsides of this technique include concerns over impurity removal, limited sources of pore formation (activation process used after the carbon has been synthesized and cleaned), and no ability to introduce surface-functional groups into the carbon.

Techniques to make nano-porous carbon for EDLC applications from chemical reagents are known. Endo et al., disclose the use of low molecular weight, modified aromatic hydrocarbon resins (Endo, M. et al., $Carbon$, 2002, 40:2613-2626). Feaver et al. disclose the use of polymers of resorcinol and formaldehyde (U.S. Pat. No. 8,404,384). These techniques have not seen any commercial success due to relatively complex manufacturing methods and limited pore creation techniques.

Techniques for making nano-porous carbon for EDLC applications using templates which are subsequently removed to leave pores behind are known. Leis et al. disclose the use of titanium carbide (TiC) templates as starting materials to produce carbon particles with a dominating pore size of 7-8 Å inside the particles and over 8 Å in the surface layer of the particles (U.S. Pat. No. 7,803,345). Coowar discloses composite electrodes prepared from mesoporous nickel hydroxide, acetylene black and polytetrafluoroethylene with pore sizes between 1 and 50 nm grown from a liquid crystal templating medium (U.S. Published Application No. 2009/0170000, Jul. 2, 2009). These methods are relatively new and their commercial success remains unproven.

SUMMARY OF THE INVENTION

In one aspect, this invention provides a method of producing nano-porous carbon, comprising: a) mixing a liquid carbonyl-containing carbon source with a liquid acidic polymerization catalyst until a solid catalyst-carbon matrix forms; b) heating the solid catalyst-carbon matrix; and c) etching the solid matrix to remove the catalyst from the carbon matrix to produce a network of pores in the carbon. In one embodiment, the method further comprises the step of activating the nano-porous carbon. In another embodiment, the activating step comprises heating under controlled atmosphere. In a further embodiment, the mixing step is performed at a controlled temperature. In another embodiment, the etching step utilizes NaOH, HCl, HF or $Cl_2$. In a further embodiment, the liquid carbonyl-containing carbon source comprises an aldehyde or a ketone that is liquid at room temperature. In a further embodiment, the aldehyde or the ketone comprises acetone, α-ionone, β-ionone, benzophenone, acetylacetone, benzaldehyde, or acetaldehyde. In another embodiment, the liquid acidic polymerization catalyst comprises $SiCl_4$ and its derivatives or $TiCl_4$ and its derivatives. In a further embodiment, the liquid acidic polymerization catalyst is tetrachlorosilane, dichlorosilane, trichlorosilane, dichlorodimethylsilane, titanium tetrachloride, titanium isopropoxide, titanium ethoxide or titanium butoxide. In another embodiment, the method further comprises the introduction of external oxygen.

In another aspect, this invention provides a method for the production of nano-porous carbon, comprising: a) mixing a liquid furfuryl compound with a liquid acidic polymerization catalyst until a solid catalyst-carbon matrix forms; b) heating the solid catalyst-carbon matrix; and c) etching the solid matrix to remove the catalyst from the carbon matrix to produce a network of pores in the carbon, wherein the rate of formation of the solid catalyst-carbon matrix is controlled by dilution of the liquid furfuryl compound with a less reactive liquid carbonyl-containing carbon source. In one embodiment, the method further comprises the step of activating the nano-porous carbon by heating under controlled atmosphere. In another embodiment, the mixing step of the method is performed at a controlled temperature. In a further embodiment, the etching step utilizes NaOH, HCl, HF or $Cl_2$. In another embodiment, the liquid furfuryl compound comprises furfuryl alcohol, acetylfuran, furfuraldehyde, 5-hydroxymethylfurfural and 5-methylfurfural. In a further embodiment, the liquid acidic polymerization catalyst comprises $SiCl_4$ and its derivatives or $TiCl_4$ and its derivatives. In another embodiment, the liquid acidic polymerization catalyst is tetrachlorosilane, dichlorosilane, trichlorosilane, dichlorodimethylsilane, titanium tetrachloride, titanium isopropoxide, titanium ethoxide or titanium butoxide. In another embodiment, the method further comprises the step of introducing external oxygen.

In another aspect, the invention provides a nano-porous carbon produced by a) mixing a liquid carbonyl-containing carbon source with a liquid acidic polymerization catalyst until a solid catalyst-carbon matrix forms; b) heating the solid catalyst-carbon matrix; and c) etching the solid matrix to remove the catalyst from the carbon matrix to produce a network of pores in the carbon.

In a further aspect, the invention provides a nano-porous carbon produced by a) mixing a liquid furfuryl compound with a liquid acidic polymerization catalyst until a solid catalyst-carbon matrix forms; b) heating the solid catalyst-carbon matrix; and c) etching the solid matrix to remove the catalyst from the carbon matrix to produce a network of pores in the carbon, wherein the rate of formation of the solid catalyst-carbon matrix is controlled by dilution of the liquid furfuryl compound with a less reactive liquid carbonyl-containing carbon source.

Other objects of the invention may be apparent to one skilled in the art upon reading the following specification and claims.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
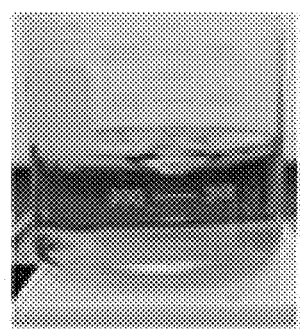
FIG. 1 depicts: (A) a mixture of β-ionone and dichlorodimethylsilane, both liquids; and (B) after polymerization is completed, a black solid appears. The reaction was carried out at room temperature and took 14 days to form a solid.
Figure 1:
Figure 1:

This application is not limited to particular methodologies or the specific compositions described, as such may, vary. It is also to be understood that the terminology used herein is for the purpose of describing particular embodiments only, and is not intended to be limiting, since the scope of the present application will be limited only by the appended claims and their equivalents.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present application, the preferred methods and materials are now described. All publications mentioned herein are incorporated herein by reference to disclose and describe the methods and/or materials in connection with which the publications are cited.

Disadvantages of Known Production Methods

The present patent application discloses a novel sol-gel process to synthesize a nano-porous solid carbon material—suitable for use in electrodes in energy storage applications—from a combination of liquid reagents that undergo a polymerization reaction. The basis for this reaction is an earlier study of the polymerization of acetone using $SiCl_4$ (Vinod, M. P. et al., *J. Phys. Chem. B*, 2003, 107:1583-1588)

for LED applications. In a related study (Vinod, M. P. et al., *Appl. Phys. Let.*, 1996, 68:81-83), conditions for the reactions to form a completely cross-linked carbon structure with large numbers of inherent $sp^2$ and sp carbons have been optimized. The presence of such carbons helps in the formation of a carbon structure with very high electrical conductivity. The mechanism of this reaction has been studied using long term in-situ NMR spectroscopy (solution and solid-state). Intermediates such as mesityl oxide (MeO), diacetone alcohol (DAA), phorone and isophorone were identified. The mechanism of the reaction is also fully established and involves $SiCl_4$ (as a Lewis acid) catalyzing the aldol condensation of acetone. The concept has also been extended to other similar reactions, e.g. a cyclic ketone (β-ionone) is also found to form a siloxane/polymer combination—with similar properties as the one obtained from acetone (Suresh, S. et al., *Chem. Mater.*, 1997, 9:1186-1190).

The same siloxane/polymer material can also be synthesized using similar or intermediate products (of the reactions described above) as starting materials for the reaction. Thus, mesityl oxide, diacetone alcohol (DAA), phorone and isophorone are also capable of creating the siloxane/polymer in question. Additionally, other starting materials (both the carbon containing compounds and the catalyzing agents) can also be used to synthesize the siloxane/polymer (or metal-oxide/polymer composite in the case of a metal containing catalyst) via the sol-gel process. For example, a furfuryl-alcohol/methyl-chlorosilane mixture will also result in the siloxane/polymer. Burket et al. have studied these polymerization reactions in furfuryl alcohol (Burket, C. L. et al., *Carbon*, 2006, 44(14):2957-2963.

The present application discloses that this type of reaction, with the internal siloxane (or metal oxide) template, is suitable to synthesize nano-porous carbon for EDLC electrodes and other applications because the template of siloxane (or other metal oxide) can be etched away to leave behind a network of pores. The ratios of the various starting materials (i.e. amount of $SiCl_4$ or similar catalyst) determine the eventual porosity of the structure following etching. Other polymerizing catalysts including, but not limited to, $TiCl_4$ and $SnCl_4$ and their derivatives, that have a similar effect (i.e. polymerizing the carbon materials with an in-situ template of siloxane or other metal-oxide molecules) are also suitable to form this porous carbon material following further processing (etching, etc).

Polymerization Reaction of Carbon-Containing Liquid Reagents to Synthesize Solid Carbon In one embodiment, the steps for the synthesis of nano-porous carbon are: 1) polymerize specific organic liquids using specified liquid catalysts resulting in a solid carbon/siloxane or solid carbon/metal-oxide structures; 2) optionally, cross link the polymer in Step 1 using additives to the starting materials resulting in a denser carbon; 3) process the resulting material to remove any un-reacted starting materials and the siloxane or metal-oxide template to produce a network of pores in the carbon; and 4) activate the resulting nano-porous carbon material.

The resulting material is suitable for use as electrodes in EDLCs, hybrid batteries, fuel cells and other energy storage devices that require nano-porous carbon electrodes. Besides energy storage applications, porous activated carbon may be used in a number of other fields including gas storage and water filtration. The techniques described herein are also suitable for synthesizing nano-porous carbon suitable for these applications.

The process of the present disclosure utilizes three different classes of organic liquids as suitable staring materials for the initial polymerization reaction. Class I compounds comprise ketones, for example, but not limited to, acetone, α-ionone, β-ionone, benzophenone, and acetylacetone, as well as any ketone that is liquid at room temperature and polymerizable under the method of the disclosure. Usually, these compounds polymerize slowly. However, using the disclosed process speeds up the polymerization to commercially attractive rates because the ketones are polymerized using strongly acidic catalysts like silane and its derivatives (for example, tetrachlorosilane, dichlorosilane, trichlorosilane, dichlorodimethylsilane, and the like), or titanium tetrachloride ($TiCl_4$) and its derivatives (for example, titanium isopropoxide, titanium ethoxide, titanium butoxide, and the like).

Class II compounds comprise aldehydes, including, but not limited to, benzaldehyde, acetaldehyde, as well as any aldehyde that is liquid at room temperature and polymerizable under the method of the disclosure. Aldehydes behave similarly to ketones under the disclosed reaction conditions and may also be polymerized using silane, and its derivatives, or $TiCl_4$, and its derivatives as described above for Class I compounds. Class I and II compounds are relatively slow-reacting as compared to Class III compounds.

Class III compounds comprise the furfuryl moiety compound and its derivatives, including, but not limited to, furfuryl alcohol, acetylfuran, furfuraldehyde, 5-hydroxymethylfurfural and 5-methylfurfural. Furfural derivatives are fast-reacting compounds that may be polymerized using acidic catalysts like silane and its derivatives, including but not limited to, tetrachlorosilane, dichlorosilane, trichlorosilane, dichloro-dimethylsilane, and the like, or $TiCl_4$ and its derivatives, including but not limited to, titanium isopropoxide, titanium ethoxide, titanium butoxide, and the like. These acidic catalysts are first diluted in solvents such as acetone to slow down and control the rate of the reaction.

Both ketones and aldehydes are polymerized using either silane or $TiCl_4$ or one of their derivatives as listed above. The polymerization reaction depends on the starting material and the ratio of the polymerizing catalyst used. Polymerization of these classes of materials to form porous carbon for use as electrodes in EDLCs, hybrid batteries or fuel cells has not previously been disclosed.

Figure 2:
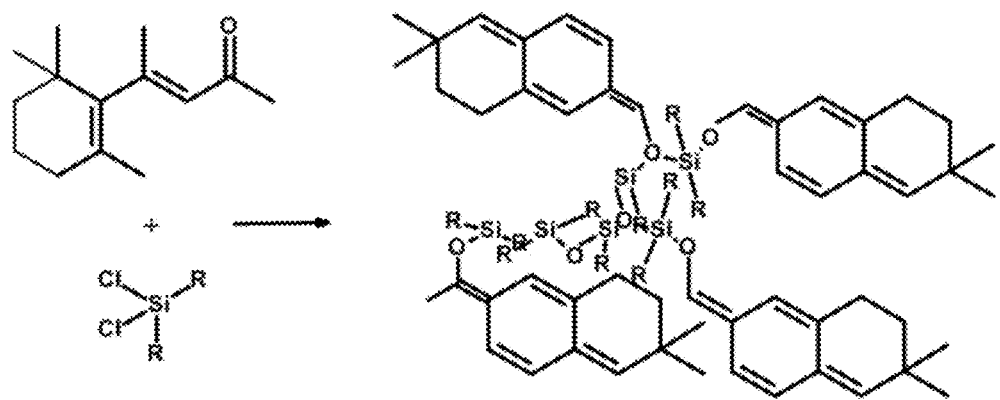
FIG. 2 shows chemical formulas depicting a polymerization reaction between a ketone (β-ionone) and a silane derivative ($Si(R)_2Cl_2$) resulting in a carbon matrix with a siloxane template and extra alkyl groups. R=alkyl groups such as methyl or ethyl.

In one embodiment, Class I compounds such as acetone, ionone, benzophenone or acetylacetone are polymerized to varying degrees using dichlorodimethylsilane [$Si(CH_3)_2Cl_2$] as the catalyst. FIG. 1 illustrates the carbon product formed by the polymerization of β-ionone using $Si(CH_3)_2Cl_2$ as the catalyst. $Si(CH_3)_2Cl_2$ is added to the β-ionone at room temperature and stirred for two hours. The mixture is then stored in a closed container for several days to form the polymerized solid carbon matrix. The polymerization reaction creates a dense, three-dimensional carbon structure with a matrix of siloxane ($R_3Si$—O—$SiR_3$) that forms in situ in the carbon material. If $TiCl_4$ (or its derivatives) is used as the polymerization agent, Ti—O molecules are formed in situ as the metal oxide matrix. The chemical reaction between β-ionone and dichlorodimethylsilane is shown in FIG. 2. The chemical reaction products shown in FIG. 2 are long chain polymers cross-linked via the siloxane molecules, with HCl, $H_2O$ and other condensation side products of the reaction not shown.

Using the method of the present disclosure, the reaction of Class I and II starting materials may be controlled by using the following techniques:

i) Concentration of polymerizing catalyst: experiments with β-ionone and dichlorodimethylsilane have shown that a direct relationship exists between increasing amounts of silane and the kinetics of the polymerization reaction. Experiments with different amounts of silane (3% to 21%, by volume) showed that the 21% ratio mixture did not result in solid polymerized carbon faster than the lower ratio mixture (11.9%) of silane to β-ionone. Depending upon the starting material used, the preferred ratio of starting material to catalyst is between about 11% and about 22%.

ii) Mixing during reaction: the carbonyl-containing organic liquid starting materials must be adequately agitated to provide good mixing with the catalyst so that the internal template of siloxane or metal-oxide (that results in pores after removal) and the cross-linking of the polymers are uniform. Mixing also provides a method to get oxygen from the surface layer of the mixture into the bulk of the liquid in the cases where additional oxygen is needed for the cross-linking function.

iii) Supply of oxygen: in some cases, additional oxygen is required during the polymerization reaction to help cross-link the polymer chains and form a harder solid. Oxygen can be supplied from the atmosphere (via mixing/agitation during the reaction) or in situ via oxygen-containing cross-linking agents like urea hydrogen peroxide. Similar considerations apply to the use of $TiCl_4$ (or its derivatives) when used as polymerization catalysts. In this case, the in situ template of Ti—O molecules helps cross link the polymers and provides the network of pores (following removal of Ti—O by further processing).

In another embodiment, Class III compounds furfuryl alcohol and its derivatives are utilized as the carbon source. In general, furfuryl alcohol and its derivatives polymerize quickly. Therefore, less acidic catalysts are used to polymerize them to achieve a more controlled reaction to create the desired fully formed network of siloxane or Ti—O molecules. Silane (or its derivatives) and $TiCl_4$ (or its derivatives) can both be used to polymerize furfuryl alcohol or its derivatives. However, the polymerization reaction conditions are adjusted appropriately for each particular carbonyl-containing carbon source.

Figure 3:
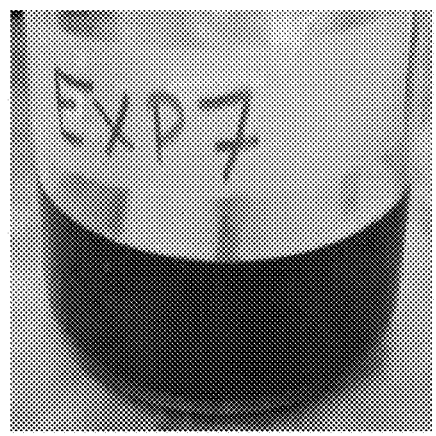
FIG. 3 depicts: (A) a mixture of 2-acetylfuran and dichlorodimethylsilane, both liquids; and (B) the black solid that forms after 8 days.
Figure 3:
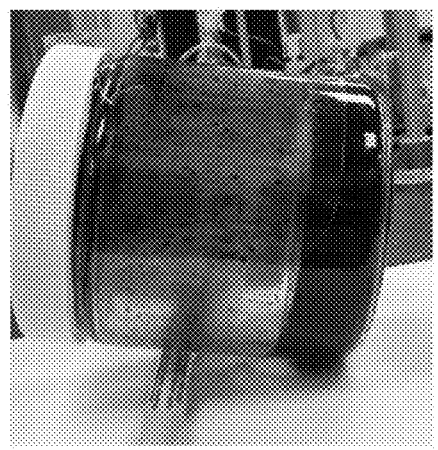
Figure 4:
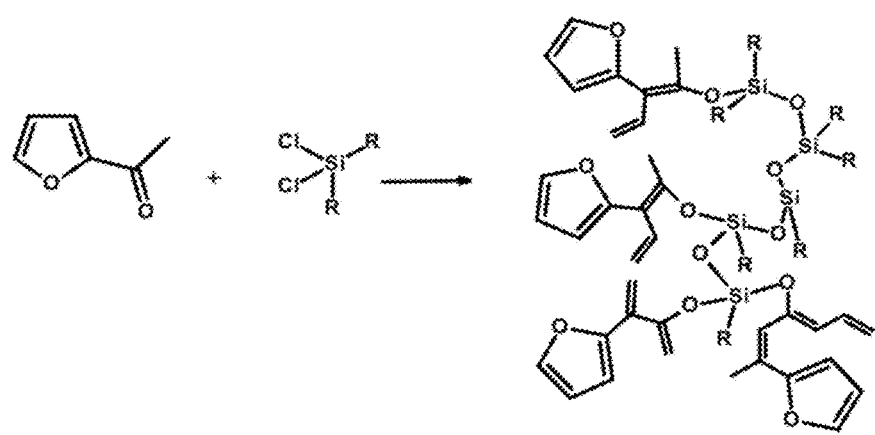
FIG. 4 shows chemical formulas depicting a polymerization reaction between 2-acetylfuran and dichlorodimethylsilane ($R=CH_3$) to give a carbon matrix with the formation of a template of siloxane template molecules. By products are not shown in the scheme.

For example, the polymerization of 2-acetylfuran using dichlorodimethylsilane as the catalyst occurs more slowly than that of furfuryl alcohol using the same catalyst. At room temperate, the 2-acetylfuran polymerization forms a solid polymer in about a week, whereas the polymerization of furfuryl alcohol with dichlorodimethylsilane can be explosive if not properly regulated. FIG. 3 illustrates the carbon product formed by the polymerization of 2-acetylfuran using $Si(CH_3)_2Cl_2$ as the catalyst. The reaction between 2-acetylfuran and dichlorodimethylsilane is shown in FIG. 4.

Using the method of the present disclosure, the process of polymerization of 2-acetylfuran may be controlled by the following techniques:

i) Using higher ratios of dichlorodimethylsilane or using more acidic catalysts like $SiCl_4$ or $TiCl_4$: using a higher ratio of dichlorodimethylsilane generally speeds up the polymerization reaction—although an optimum ratio exists depending on other variables that affect reaction.

ii) Agitation/stirring of the liquid mixture during polymerization: this ensures a uniform distribution of the siloxane molecules after solidification (or Ti—O, if $TiCl_4$ or its derivatives are used), and consequently a uniform pore structure.

iii) Temperature: elevated temperatures in the range of 50 to 60° C. (2-acetylfuran boils at 67° C.) accelerate the polymerization reaction.

iv) Cross-linking agents: in the event that the solidification reaction is further enhanced by cross-linking agents like oxygen, stirring of the liquid mixture during polymerization will allow more access to atmospheric oxygen by enhancing the diffusion of oxygen to the body of the polymerizing liquid.

Figure 5:
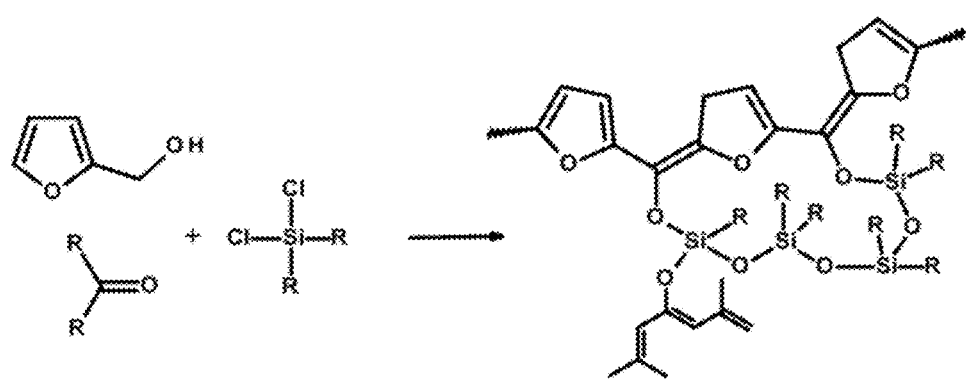
FIG. 5 depicts chemical formulas depicting a polymerization reaction of a mixture of furfuryl alcohol and acetone catalyzed by dichlorodimethylsilane showing a matrix of siloxane molecules embedded in the polymerized carbon. Side products ($H_2O$, HCl, others) are not shown.

Furfuryl alcohol, on the other hand, exhibits very fast polymerization reactions with dichlorodimethylsilane (almost instantaneous), resulting in non-uniform solids that may not useful as starting materials for porous carbon materials EDLC electrode carbon. The polymerization reaction of furfuryl alcohol (diluted with acetone) using $Si(CH_3)_2Cl_2$ as the catalyst is shown in FIG. 5.

Using the method of the present disclosure, the furfuryl alcohol polymerization reaction may be controlled using the following techniques:

i) Ratio of catalyzing agent to furfuryl alcohol: increasing the ratio of dichlorodimethylsilane to furfuryl alcohol speeds up the polymerization and cross-linking process dramatically (from 2 months with a 1% ratio of silane to several minutes to hours with a silane-to-furfuryl alcohol ratio in the range of 20-30%, by weight).

ii) Diluting the furfuryl alcohol with other reagents like acetone (i.e. compounds that have slower polymerizing reactions in the presence of the same catalysts). Adding acetone to furfuryl alcohol before adding silane, or alternatively, adding acetone to silane before adding the mixture to furfuryl alcohol, helps control the polymerization reaction by slowing it down and allows for a more uniform solid carbon material. Acetone may also be added to both the furfuryl alcohol and to the silane before they are combined.

iii) Diluting the furfuryl alcohol with 2-acetylfuran (i.e. compounds that have slower polymerizing reactions in the presence of the same catalysts): adding 2-acetylfuran to furfuryl alcohol slows the polymerization reaction in the presence of dichloro-dimethylsilane. This combination also leaves some unreacted 2-acetylfuran after polymerization and solidification, which, when evaporated, results in additional new pores in the solid carbon material.

iv) Reducing the temperature of the mixture to slow down the reaction: experiments performed with similar silane/furfuryl alcohol ratios, but at different temperatures (one at room temperature, the other at ~−30° C.) demonstrated that lower temperatures resulted in slower reactions and allowed for the formation of more uniform solids.

v) Increasing the pH of the reaction: adding basic compounds like NaOH pellets to increase the pH of the furfuryl alcohol before adding the polymerizing catalyst (silane or $TiCl_4$) slows the reaction. Experiments performed with and without the addition of up to 0.5 g of NaOH to furfuryl alcohol mixtures with up to 25 g of furfuryl alcohol demonstrated that the addition of the NaOH pellets slowed the polymerization reaction resulting in a more uniform solid carbon material.

vi) Mixing: agitating the mixture of the furfuryl alcohol and catalyst results in a uniform polymerization reaction and a uniform distribution of the internal template of siloxane and Ti—O compounds. If dichlorodimethylsilane is added to furfuryl alcohol without stirring, even drop by drop, the reaction is rapid enough to create a small explosion. However, as soon as stirring is initiated, the rate of reaction is slow enough to be safe.

vii) Oxygen: oxygen is known to enhance the polymerization and cross-linking of furfuryl alcohol (Gonzalez, R. et al., *Makromol. Chem.*, 1992, 193:1-9). Oxygen is supplied to the bulk of the furfuryl/catalyst mixture either from the atmosphere through mixing/stirring or in situ by oxygen-bearing compounds (like urea hydrogen peroxide) that are added to the mixture. Experiments conducted with small volumes of furfuryl alcohol (higher surface areas and thus more access to oxygen) and larger volumes of furfuryl alcohol in closed containers (smaller surface areas and limited access to oxygen) demonstrated that more uniform solids form with the smaller volumes, i.e. greater access to oxygen.

In one embodiment, furfuryl alcohol may be diluted by carbonyl-containing starting materials, such as acetone or 2-acetylfuran, to slow the rate of polymerization of the furfuryl alcohol. If any of the diluent remains after the polymerization, it will evaporate over time. Evaporation may be accelerated by moderate heating at 50-120° C. In this embodiment, the evaporation of the diluent advantageously leaves an additional network of pores in the solid carbon material. This method of forming pores in carbon is also new. Weight balance calculations revealed that some of the acetone (a carbonyl-containing carbon source) also becomes integrated in the final polymerized carbon because the final stable weight of the carbon solid (after evaporation of the non-reacted materials) is greater than the weight of just the furfuryl alcohol and silane.

In large-scale reactions using the method of the disclosure, mixing is achieved in a chemical reactor by controlling the viscosity of the reaction intermediates. To allow uniform mixing of the reactants, the liquid catalyst is added slowly to the larger volume of the carbonyl-containing starting material with mixing. Thus, the polymerization reaction proceeds slowly at first. With continued addition of the liquid catalyst, and continuous mixing, eventually the entire reaction mixture undergoes polymerization. Optionally, oxygen may be added during the mixing by direct continuous introduction of air into the reaction chamber. Mixing on a large scale may be accomplished using equipment known in the art, for example, by Teflon®-coated stirrers. Such stirrers are removed after solidification of the reaction mixture.

The pH of the reaction mixture is conveniently controlled by the addition of sodium hydroxide (NaOH) in pellet form to the starting materials. If acetone is used as a diluent for other starting materials, the NaOH is optimally added to the acetone first, which helps dehydrate it so that undesirable hydrolysis of chloride-containing catalysts does not occur.

Processing of Polymerized Carbon

After polymerization, the carbon material will contain not only the product of the polymerization reaction, but also a template of metal oxide (depending on the catalyzing agents used), some by products (like HCl, $H_2O$, etc.) and potentially some un-reacted starting materials. The polymerized material is then subjected to a heat treatment step in a standard lab furnace, for example, a muffle furnace, with a controlled inert atmosphere of either nitrogen or argon at 400° C.-700° C. for a pre-determined amount of time (depending on the precursor material). The heating rate of the process is controlled in the range of 1° C./min to 10° C./min. This heat treatment step activates the chemical reaction involving the elimination of the oxygen functional groups to ultimately provide rigidity to the carbon structure that forms inside the siloxane matrix. Also, it eliminates any remaining volatiles and completes any cross-linking reactions (Titirici, M-M. et al., *Adv. Fund. Mater.*, 2007, 17:1010-1018).

The siloxane/polymer complex is then treated with NaOH, HCl, HF or $Cl_2$ with concentration ranging from 0.5 to 3M to remove the siloxane template. Where $TiCl_4$ (or its derivatives) is used to effect polymerization, the chemical etchants will remove the Ti—O network of molecules inside the carbon matrix. Etching is carried out in the temperature range of 20-100° C. and is followed by washing thoroughly with distilled water in the same temperature range to remove the reagents. For example, the carbon with embedded silica or titanium may be boiled at 100° C. in 1 M NaOH, followed by a rinse with distilled water. The whole process, etching and washing, is then repeated several times to ensure removal of all siloxane or metal-oxide and etching reagents. On a commercial scale, etching is carried out in a large distillation condenser apparatus, known in the art, with an interior constructed of glass or a thermally stable polymer such as Teflon, polypropylene, or high density polyethylene.

Figure 6:
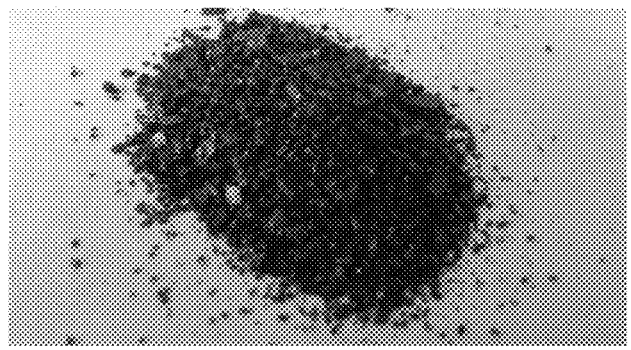
FIG. 6 shows solid carbon from the polymerization of 2-acetylfuran with $Si(CH_3)_2Cl_2$: A, after polymerization; and B, after $CO_2$ activation at 1000° C.
Figure 6:

Following the etching process, the nano-porous carbon structure is air dried at temperatures ranging from 25-150° C. The resulting material is activated by heat-treating in a controlled atmosphere furnace in two stages. First, the carbon is heated up to temperatures of 1100° C.+/−100° C. under nitrogen or argon. Once the necessary temperature is reached, the activation process involves exposing the carbon to steam, $NH_3$, or $CO_2$ for up to 120 minutes. Cooling is performed under inert atmosphere. (See Ragan, S, and Megonnell, N., *Cellulose Chem. Tech.*, 2011, 45(7):527.) FIG. 6 shows an example of carbon powder synthesized by the polymerization of furfuryl alcohol in the presence of alumina nano-particles, after etching and activation.

The material is then pulverized using jet-milling (or similar techniques) to produce the particle size in the range of 1µ to 6µ. A suitable pulverization device is a CONDUX Conjet® High-Density Bed Jet Mill (NETZSCH Premier Technologies, LLC, Exton, Pa.). The nano-porous carbon material is now ready for rolling into sheets using standard practices known in the art, and can be used as electrodes in energy storage devices like supercapacitors or hybrid battery/EDLC devices.

Uses of Nano-Porous Carbon Obtained from Processed Polymerized Carbon

The nano-porous carbon powder obtained from this disclosed method of polymerization, heat treatment and etching is suitable for use in number of different applications. These include: 1) electrodes for EDLC devices; 2) water purification and filtration; 3) hydrogen gas storage; 4) methane gas storage; and 5) lithium battery applications.

The carbon powder obtained from the disclosed method is suitable for use in electrodes for EDLC devices. Different techniques can be used to make electrodes from the porous carbon powder obtained from the method disclosed in this filing. For example, electrodes may be made by using a slurry of the porous carbon material, Nafion® ionomer, graphite fibers, and N,N-dimethylacetamide (45 wt. % carbon, 50 wt. % of Nafion, and 5 wt % graphite fibers in water) according to the method of Lufrano et al. (*Int. J. Electrochem. Sci.*, 2010, 5: 903-916). Alternatively, a slurry of 80% activated carbon with 10% carbon black and 10% polyvinylidene fluoride binder in N-methyl-2-pyrrolidinon may be used (Wei, Di, and Tin Wing Ng, *Electrochemistry Communications*, 2009, 11(10):1996-1999). Electrodes may also be manufactured from a slurry of 95 wt % activated carbon, 3 wt % carboxymethyl cellulose sodium and 2 wt % polytetrafluoroethylene in water according to the method of Portet et al. (*Electrochimica Acta*, 2005, 50(20):4174-4181) or by using a slurry of carbon (70 wt %), acetylene black (20 wt %) and polytetrafluoroethylene 60 wt. % dispersion in water (10 wt %) according to the method of Isikli et al. (*J. Power Sources*, 2012, 206: 53-58).

These electrodes are compatible with all the various classes of electrolytes used to construct the EDLC devices, and include: 1) aqueous electrolytes (for example, $H_2SO_4$, NaOH, NF, and the like); 2) non-aqueous electrolytes (for example, acetonitrile, propylene carbonate, and the like); 3) ionic liquid electrolytes (for example, (1-ethyl-3-methylimizadolium bis(trifluoromethanesulfonyl)amide [C2mim] [NTf2]); 1-ethyl-3-methyl imidazolium tetrafluoroborate, and the like); and 4) gelled electrolytes (for example, polystyrene-poly(methyl methacrylate), poly(ethylene oxide), poly(acrylonitrile), and the like).

Nano-porous carbon material produced by the disclosed method can also be used in water purification applications. Activated carbon-based materials can effectively remove pesticides, industrial chemicals, tastes, odors and cyanobacteria from contaminated water. For example, activated carbon is used to remove toxicity from drinking water caused by cyanobacterial blooms (Falconer, I. R. et al., *J. Am. Water Works Assn.*, 1989, pp. 102-105). By controlling the pore size and its distribution as disclosed here, more efficient purification can be achieved. The process to manufacture carbon powder filters with nano-meter sized pores is similar to that described above.

Storage of hydrogen is another application for nano-porous carbon materials. Safe storage is critical for transportation of hydrogen and also in hydrogen fuel cell based Hybrid Electric vehicle (HEV) applications. Carbon 'nano-fiber' based materials—with efficient absorption of hydrogen (60%)—are used in this application today (Schmill, H. G. et al., *Chemistry-A European Journal*, 2003, 19:4764-4770; Tylianakis, E. et al., *Int. J. Hydrogen Energy*, 39(18): 9825-9829). By controlling the pore size and using a special heat treatment above 1500° C.—in presence of a catalyst like nickel—carbon nano-fiber can also be produced from the precursor materials described in this disclosure. More efficient absorption and storage of hydrogen can be achieved with better control of pore-size and distribution as described herein.

With the recent discovery of large amounts of natural gas resources, methane storage is another emerging application for activated carbon based materials. Liquefaction and compression is conventionally used for the methane storage and transportation. The U.S. Department of Energy has a target of 150 ml of methane per 1 ml of absorbent—under a pressure of 3.5 MPa at 25° C. (He, Y. et al., *Chem. Commun.*, 2012, 48(97):11813-11831; Lee, Jeongyong, "Synthesis and Gas Sorption of Microporous Metal Organic Frameworks for Hydrogen and Methane Storage," *Proquest*, 2007). Theoretical calculations show that pore size of 1.14 nm is ideal for methane storage in activated carbon based materials. Monolithic nano-porous carbon materials—with this pore size—can be produced using the techniques described herein. The large percentage of nano-pores in carbon material synthesized from the precursor materials described in this disclosure makes it ideal for storage of methane.

The nano-porous carbon materials discussed in this disclosure are also suitable in anode materials in rechargeable lithium batteries. Large theoretical capacities (e.g. >1000 Wh/Kg) have been calculated for these carbon based anode materials, based on further treatment above 1200° C. to create an ordered structure (more ordered than conventional activated carbon but less ordered than graphite). These ordered carbon material are known to have much higher capacitance than graphite and are suitable for making anodes for lithium ion batteries (Masaki, Y. et al., *Lithium Ion Batteries*, 2009, Springer; Park, M-H. et al., *Nano Ltrs.*, 2014; Jacques, E., et al., *Carbon*, 2014, 68:725-733).

EXAMPLES

Example 1

Polymerization of β-Ionone Using Dichlorodimethylsilane

In a one-liter beaker, 250 mL of β-ionone (Sigma-Aldrich, St. Louis, Mo.) was stirred for two minutes using a magnetic stirrer. Catalyst dichlorodimethylsilane, $Si(CH_3)_2Cl_2$ (8.5 mL) (Sigma-Aldrich) was added slowly. Stirring was continued for 5 minutes and the stir bar was then removed. The mixture was transferred to a 500-mL (16 oz.) glass jar. The mouth of the jar was covered with Teflon tape before the jar cap was screwed on. The jar was allowed to stand at room temperature for 1,000 hours.

The same procedure was repeated using 17 mL, 34 mL, and 68 mL of dichloro-dimethylsilane. The results obtained are shown in FIG. 2 and summarized in Table 1.

TABLE 1

| mL $Si(CH_3)_2Cl_2$ | Grams $Si(CH_3)_2Cl_2$ | Hours aged | Results |
|---|---|---|---|
| 8.5 | 9.04 | 1000 | thick black liquid, no solid |
| 17 | 18.09 | 1000 | thick black liquid, no solid |
| 34 | 36.18 | 384 | black solid formed (see FIG. 2) |
| 68 | 72.35 | 450 + 500 | at 450 hrs, very thick viscous liquid; no solid, even at 950 hrs |

Although the experiment using 68 mL of dichlorodimethylsilane should have provided enough catalyst to produce a solid product, it did not. Other factors, such as the extent of mixing, access to oxygen and reaction temperature may have had an effect.

Example 2

Polymerization of 2-Acetylfuran Using Dichlorodimethylsilane

In a one-liter beaker, 100 g of 2-acetylfuran (Sigma-Aldrich) was stirred for a few minutes using a magnetic stirrer. Catalyst dichlorodimethylsilane, $Si(CH_3)_2Cl_2$ (25 mL) (Sigma-Aldrich), was added slowly. Stirring was continued for 5 minutes and the stir bar was then removed. The mixture was transferred to a 500-mL (16 oz.) glass jar. The mouth of the jar was covered with Teflon tape before the jar cap was screwed on. The jar was allowed to stand at room temperature for 190 hours. A black solid formed.

Example 3

Polymerization of Furfuryl Alcohol Using Dichlorodimethylsilane

Using a similar procedure to that described in Example 1, various amounts of furfuryl alcohol (Sigma-Aldrich) were subject to the polymerization conditions summarized in Table 2. In a 1 liter beaker, the varying amounts of dichlorodimethylsilane were added to varying amounts of furfuryl alcohol as shown in Table 2, with and without acetone and/or NaOH pellets. The addition of acetone moderates the reaction. In other cases, anhydrous NaOH anhydride was added to slow down the polymerization reaction. The NaOH reduces the acidic nature of the silane catalyst. In the cases where an immediate explosive reaction did not occur, the reaction mixture was aged overnight. Dry ice was used to cool the outside of the reaction vessel where indicated in Table 2 to reduce the reaction temperature.

TABLE 2

| Exp # | Acetone (mL) | Silane (mL) | Furfuryl (mL) | NaOH (g) | Dry Ice | Immediately after Mixing | Removed from Dry Ice | Further Processing: Result |
|---|---|---|---|---|---|---|---|---|
| 1 | 50 | 18.5 | 50 | 0 | No | Explosion | N/A | N/A |
| 2 | 50 | 15 | 50 | 0.1 | Yes | Liquid | No | Let stand. Solid formed overnight. |
| 3 | 30 | 10 | 10 | 0 | No | Liquid | No | Let stand. Solid formed overnight. |
| 4 | 30 | 10 | 20 | 0.1 | No | Liquid | No | Let stand. Solid formed overnight. |
| 5 | 30 | 10 | 30 | 0.1 | No | Explosion | N/A | N/A |
| 6 | 30 | 10 | 25 | 0.1 | Yes | Liquid | Yes | Put in oven at 80° C., solid formed in 15 minutes |
| 7 | 30 | 10 | 25 | 0.1 | Yes | Liquid | No | Let stand. Solid formed overnight. |
| 8 | 30 | 10 | 25 | 0.1 | Yes | Liquid | Yes | Refrigerated at 1° C. for 4.5 hours, still liquid. Let stand at RT overnight. Solid formed. |
| 9 | 30 | 8 | 25 | 0 | No | Liquid | N/A | Refrigerated at 1° C. overnight. Solid formed. |
| 10 | 30 | 8 | 25 | 0 | Yes | Liquid | No | Let stand. Solid formed overnight. |
| 11 | 30 | 10 | 25 | 0.1 | Yes | Liquid | No | Let stand. Solid formed in 7 hours. |
| 12 | 5 | 5 | 30 | 0 | Yes | Liquid | Yes | Exploded as soon as removed from dry ice. |

As can be seen from Table 2, when the dichlorodimethylsilane to furfuryl alcohol ratio is higher, and when the reaction temperature is higher, the reaction tends to be uncontrolled and explodes. Either the addition of acetone and/or reduction of the acidity of the reaction by the addition of NaOH controls the rate of reaction and allows the production of the desired product. However, the most important factor in controlling the reaction is the ratio between furfuryl alcohol and dichlorodimethylsilane. To confirm this conclusion, an experiment in which only 1% by weight of dichlorodimethylsilane was added to furfuryl alcohol under the same conditions as above. This mixture was allowed to stand at room temperature and a black solid formed after two months.

Example 4

Processing of Polymerized Carbon

As described above, in a one-liter beaker, 150 mL of furfuryl alcohol (Sigma-Aldrich) along with 125 mL acetone (high purity, HPLC grade) was stirred for a few minutes using a magnetic stirrer. NaOH pellets (0.1 g) were then added to the mixture and dry ice was packed around the beaker to cool it down. Catalyst dichlorodimethylsilane, $Si(CH_3)_2Cl_2$ (30 mL) (Sigma-Aldrich), was added slowly. Stirring was continued. A black solid formed.

The polymerized material was then heated to 600° C. over a period of one hour in a vacuum tube furnace (Model #GSL-1100, MTI Corporation, Richmond, Calif., US), for under a controlled nitrogen atmosphere. The furnace was maintained at 600° C. for one hour, then allowed to cool naturally to room temperature. The polymerized materials were loaded into quartz boats that were then placed in the center of the quartz tube. Gas lines were attached to one side of the tube using the vacuum fittings provided with the furnace. The other side was left open to atmosphere, via a plastic tube immersed in a beaker of water.

The siloxane/polymer complex was then treated with a 1M aqueous solution of NaOH to remove the siloxane template. Etching was carried out on a hotplate at 60° C. and was followed by washing thoroughly with distilled water at the same temperature to remove the reagents.

Following the etching process, the resulting nano-porous carbon structure was air dried between room temperature to 150° C. This material was activated by heat-treating in a controlled atmosphere furnace in two stages. First, the carbon was heated to 1000° C. under nitrogen in the same furnace described above. Then, the activation process was completed by exposing the carbon to $CO_2$ for one hour, then cooling the activated carbon under nitrogen.

Example 5

Nano-Porosity Measurements

Figure 7:
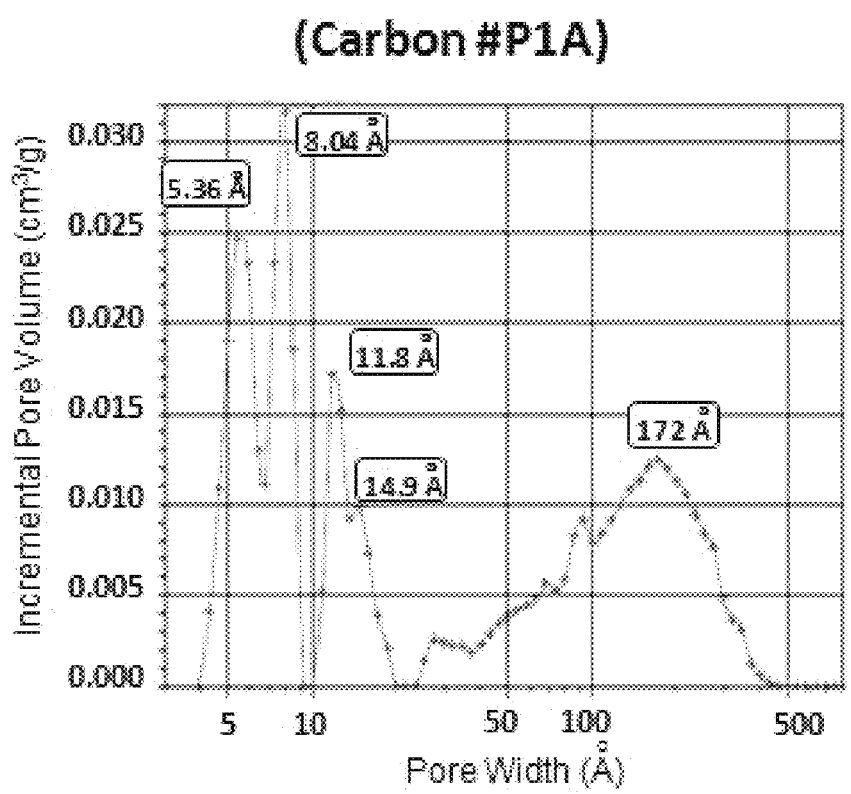
FIG. 7 is a graph of porosity measurements determined using the BET method on Sample P1A showing pores with sizes around 5, 8, 12-15 and 172 angstroms.

Nano-porosity measurements were conducted on three samples of porous carbon produced by the methods described above. Sample P1A was synthesized by mixing 150 mL of acetone with 125 mL of furfuryl alcohol in the presence of 0.1 gm of NaOH pellets for 45 minutes. Next, 30 mL of dichlorodimethylsilane were added slowly. The mixture was kept cold using external dry ice. Stirring was continued until a hard, dry black solid was obtained. The solid was then pulverized into smaller chunks (~0.5 cm) and heat treated at 600° C. for 1 hour under nitrogen. The resulting material was etched in a 1M solution of NaOH. The etching step was repeated several times, followed by washing in di-ionized water. Next, the material was further pulverized into smaller powder-like pieces (~1-2 mm) and activated at 1000° C. under $CO_2$. A sample was sent to an external commercial lab (Micromeritics Analytical Services, Norcross, Ga., US) and measured for porosity using a Micropore Pore Size Distribution (High-resolution micropore analysis plus mesopore isotherm (4 Å to 3000 Å) ISO 15901-3). The results are shown in FIG. 7. The test conditions used were: nitrogen as the analysis gas; analysis bath temperature of 77° K; 15-30 sec equilibration time; and 100-200 mg sample mass.

Figure 8:
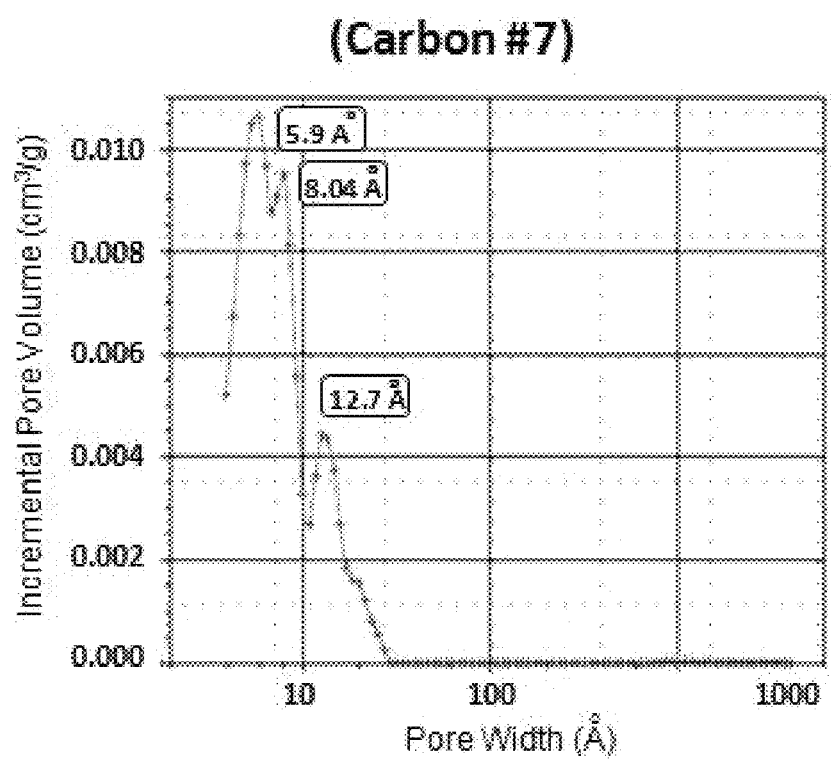
FIG. 8 is a graph of porosity measurements determined using the BET method on Sample 7 showing pores with sizes around 6, 8, and 12 angstroms.

Sample 7 was synthesized by mixing 25 mL of dichlorodimethylsilane into 100 mL of 2-acetylfuran at room temperature. The mixture was stirred for 30 minutes and then decanted into a glass jar and sealed with a Teflon cap. The liquid mixture turned into a black solid in 8 days at room temperature (see FIG. 3). The solid was then heated at 200° C. under atmosphere for 1 hour before being pulverized into smaller chunks and heat-treated at 600° C. under nitrogen for 1 hour. Next, the material was etched several times with a 1M solution of NaOH and washed with de-ionized water. Finally, the material was further pulverized into smaller powder-like pieces (~1-2 mm) and activated at 1000° C. under $CO_2$. A sample was sent to an external commercial lab (Micromeritics Analytical Services) and measured for porosity using the test method as described above. Results are shown in FIG. 8.

For comparison purposes, a sample of YP50, obtained from Kuraray Chemical Co., Ltd. (Osaka, Japan), was sent for analysis at Micromeritics Analytical Services for BET analysis. YP50 is currently the industry standard nano-porous carbon used for supercapacitor electrode materials. Similar testing parameters were used and the results of these porosity measurements are shown in FIG. 10.

Figure 9:
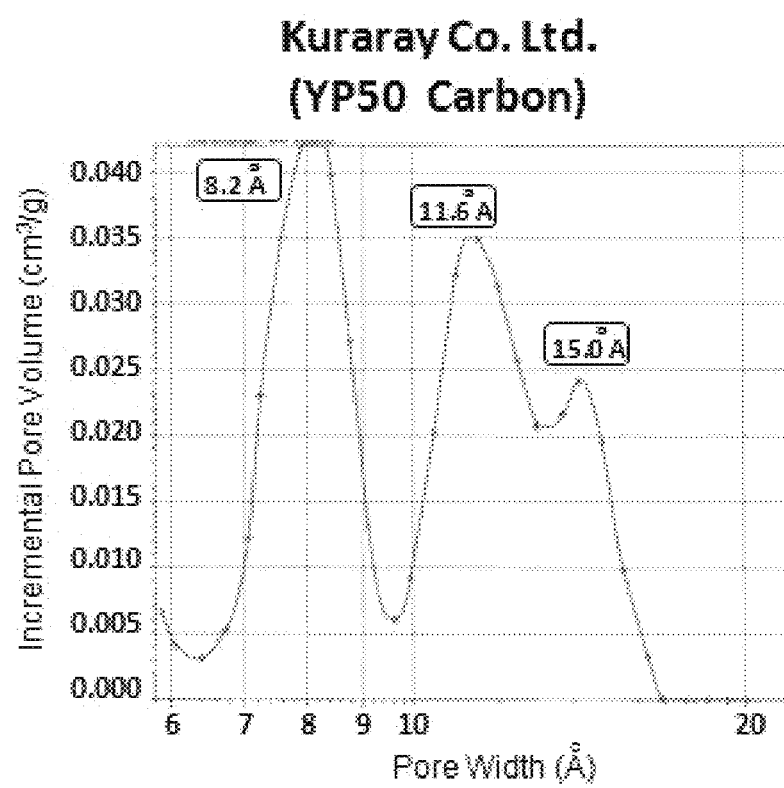
FIG. 9 is a graph of porosity measurements determined using the BET method on a sample of commercial carbon YP50 (Kuraray Chemical Co., Ltd.) showing pores with sizes around 8, 12 and 15 angstroms.

Table 3 compares the pore sizes as measured using the technique described above. The results are plotted in FIGS. 7 through 9.

TABLE 3

| Sample | Pore size (Å) | Pore size (Å) | Pore size (Å) | Pore size (Å) | Pore size (Å) |
|---|---|---|---|---|---|
| #YP50: Commercial | not seen | 8.2 | 11.6-15.0 | not seen | not seen |
| #P1A: furfuryl alcohol/ $Si(CH_3)_2Cl_2$ | 5.36 | 8.04 | 11.8-14.9 | not seen | 172 |
| #7: 2-acetylfuran/ $Si(CH_3)_2Cl_2$ | 5.9 | 8.04 | 12.7 | not seen | not seen |

Compared to the industry-standard material YP50, one can see that Samples P1A and 7 also have pores in the same size range, i.e. a peak around 8 angstroms and a peak around the 12-17 angstrom range. The larger range of the X-axis for Sample 7 likely obscures the finer detail of the other plots whose larger scale allows the dual peaks in the 11-17 angstrom range to be shown distinctly. However, this scale difference does not detract from the main results that demonstrate that the samples produced by the method of the present disclosure show more pore sizes than does Sample YP50. In the case of Samples 7 and P1A, there are peaks around the 5 angstrom range. These could be the result of the etching of the Si-based embedded matrix that results from the use of dichlorodimethylsilane in both synthetic processes. Additionally, Sample P1A also shows a peak around 170 angstroms, while Sample 7 does not show any larger pores. This result could be related to the use of acetone in the production of Sample P1A. Thus, the porous carbon produced by the method of this disclosure not only has the same pore-sizes as the industry standard, but also contain pores that are smaller and larger than these standard sizes.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of producing a nano-porous carbon, comprising:
   a) mixing a liquid organic compound, wherein the liquid organic compound is at least one of a furfuryl-functional-group compound and an acetyl-functional-group compound, with a liquid acidic polymerization catalyst, wherein the liquid acidic polymerization catalyst is a silane, to make a solid polymerized material;
   b) heating the solid polymerized material to make a carbonized material, wherein the carbonized material contains a carbon and residue of Si or Si—O material from the liquid acidic polymerization catalyst;
   c) etching the carbonized material to remove the residue of the Si or Si—O material to form a pure carbon material and
   d) activating the pure carbon material to form the nano-porous carbon to be used as an electrode in energy storage applications.

2. The method according to claim 1, the nano-porous carbon has a pore size of less than 1 nm.

3. The method according to claim 1, wherein the activation is done by heating under controlled temperature with at least one of a carbon dioxide, nitrogen or steam atmosphere.

4. The method according to claim 1, wherein the mixing and polymerization steps are performed at a controlled temperature, wherein the controlled temperature ranges between −67° C. to 80° C.

5. The method according to claim 1, wherein the etching step utilizes NaOH, HCl, HF or $Cl_2$.

6. The method of claim 1, wherein the liquid furfuryl-functional-group compound consists of a furfuryl alcohol, acetylfuran, furfurylaldehyde, 5-hydroxymethylfurfuryl and 5-hydroxymethyl furfuryl.

7. The method according to claim 1, wherein the acetyl-functional-group compound consists of an acetylfuran, acetone, α-ionone, β-ionone, benzophenone, and acetylacetone acetylfuran.

8. The method of claim 1, wherein the heating is carried out in an inert atmosphere and between 600-800° C. temperature.

9. The method according to claim 1, wherein the liquid acidic polymerization catalyst silane consists of a tetrachlorosilane, dichlorosilane, trichlorosilane, and dichlorodimethylsilane.

10. A method to make a nano-porous carbon, comprising:
a) mixing a liquid organic compound, wherein the liquid organic compound is at least one of a furfuryl-functional-group compound and an acetyl-functional-group compound, with a liquid polymerization catalyst, wherein the liquid polymerization catalyst is a titanium compound, to make a solid polymerized material,
b) heating the solid polymerized material to make a carbonized material, wherein the carbonized material contains carbon and residue from the liquid Titanium compound used as the polymerization catalyst;
c) etching the carbonized material to remove the residue from the titanium compound polymerization catalyst, to form a pure carbon material and
d) activating the pure carbon material to form the nano-porous carbon to be used as an electrode in energy storage applications.

11. The method according to claim 10, wherein the heating and etching steps are performed at a controlled temperature, wherein the controlled temperature ranges between −67° C. to 80° C.

12. The method according to claim 10, wherein the etching step utilizes NaOH, HCl, HF or $Cl_2$.

13. The method according to claim 10, wherein the liquid furfuryl-functional group compound consists of a furfuryl alcohol, acetylfuran, furfurylaldehyde, 5-hydroxymethylfurfuryl and 5-methylfurfural.

14. The method according to claim 10, wherein the liquid titanium compound used as a polymerization catalyst consists of a titanium tetrachloride, titanium isopropoxide, titanium ethoxide and titanium butoxide.

15. The method according to claim 10, wherein the acetyl-functional-group compound consists of an acetylfuran, acetone, α-ionone, β-ionone, benzophenone, and acetylacetone.

16. The method of claim 10, wherein the heating is carried out in an inert atmosphere and between 600 and 800° C. temperature.

17. The method according to claim 10, wherein the activation is done by heating under controlled temperature with at least one of a carbon dioxide, nitrogen or steam atmosphere.

18. The method according to claim 10, the nano-porous carbon has a pore size of less than 1 nm.

* * * * *